United States Patent
Kamran et al.

(10) Patent No.: US 10,671,453 B1
(45) Date of Patent: Jun. 2, 2020

(54) DATA STORAGE SYSTEM EMPLOYING TWO-LEVEL SCHEDULING OF PROCESSING CORES

(71) Applicant: EMC IP Holding Company LLC, Hopkinton, MA (US)

(72) Inventors: Lior Kamran, Richon LeZion (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/396,999

(22) Filed: Apr. 29, 2019

(51) Int. Cl.
| | |
|---|---|
| *G06F 3/00* | (2006.01) |
| *G06F 9/54* | (2006.01) |
| *G06F 1/3234* | (2019.01) |
| *G06F 9/38* | (2018.01) |
| *G06F 1/3228* | (2019.01) |
| *G06F 9/48* | (2006.01) |

(52) U.S. Cl.
CPC ............ *G06F 9/542* (2013.01); *G06F 1/3228* (2013.01); *G06F 1/3243* (2013.01); *G06F 9/3836* (2013.01); *G06F 9/4881* (2013.01); *G06F 9/545* (2013.01)

(58) Field of Classification Search
CPC ....................................................... G06F 9/542
USPC ............................................................ 719/318
See application file for complete search history.

(56) References Cited

U.S. PATENT DOCUMENTS

| | | | |
|---|---|---|---|
| 8,589,625 B2 | 11/2013 | Colgrove et al. | |
| 8,621,184 B1 | 12/2013 | Radhakrishnan et al. | |
| 8,751,773 B2 | 6/2014 | Lippett | |
| 2011/0099552 A1 | 4/2011 | Avni et al. | |

FOREIGN PATENT DOCUMENTS

WO      2011011156      1/2011

OTHER PUBLICATIONS

Kishore Kumarz, Thread Reinforcer: Dynamically Determining Number of Threads via OS Level Monitoring. (Year: 2011).*

* cited by examiner

*Primary Examiner* — Lechi Truong
(74) *Attorney, Agent, or Firm* — BainwoodHuang

(57) ABSTRACT

Two-level multitasked operation of a data storage system includes, at a first level, performing event-driven, preemptive scheduling between a first application and a second application such as a file application. First threads are distributed among processing cores and each has a set of IO providers for polling respective interfaces for events. The first application also includes wakeup threads scheduled upon occurrence of the events. At a second level, additional operations include: (1) by the wakeup thread upon occurrence of the events, activating the first threads on respective cores, and (2) by each of the first threads upon being activated, (i) continually polling the interfaces for events requiring processing, and (ii) performing associated processing tasks for the events until there are no unprocessed events, and thereupon returning control over use of the processing core to the first-level scheduling.

7 Claims, 4 Drawing Sheets

DATA STORAGE SYSTEM EMPLOYING TWO-LEVEL SCHEDULING OF PROCESSING CORES

BACKGROUND

The present invention is related to the field of data storage systems, and in particular to the scheduling of a block-storage application executed in a data storage system.

SUMMARY

A method of two-level multitasked operation of a data storage node of a data storage system includes, at a first level, performing event-driven, preemptive scheduling between a first application and a second application being subject to a user operation pattern, the first application including a plurality of first threads distributed among corresponding processing cores of the data storage node, each first thread having a regular operation of polling respective interfaces of the data storage node for events for the first application.

The method further includes, at a second level, by the first application: (1) upon occurrence of activating events, activating corresponding first threads of the first application on respective processing cores, and (2) by each of the first threads upon being activated, (i) continually polling the interfaces of the data storage node for additional events requiring processing, and (ii) performing processing tasks for the additional events until there are no unprocessed additional events, and thereupon entering a sleep state and returning control over use of the respective processing core to the first-level scheduling to thereby adapt use of the processing cores according to the user operation pattern.

In one embodiment the first application is a block-storage application and the first threads are block threads each including a respective set of 10 providers for performing the polling of the respective interfaces, and the block-storage application includes wakeup threads being scheduled at the second level upon occurrence of the events, and operative to activate corresponding ones of the block threads of the block-storage application on respective processing cores.

By the two-level scheduling approach, an event-driven storage system is created from a first application (e.g., block application) that uses a polling model. The technique enables multitasking of such a first application with other applications, such as a file-based application, along with dynamic adaptation to user operation pattern.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Described herein is a distributed storage system with storage nodes that are connected together in a network and may be managed by a separate system manager. Each storage node includes one or more multi-core CPUs and is running a Block application that creates a single hard-affined OS-thread (called a block thread) per every CPU core, which implements block-storage functionality. As part of its operation, each block thread always polls its interfaces for new events. For example, it polls for completions of submitted IO requests to back-end storage devices, and polls for new IO requests from separate host computers. Therefore, each block thread by design would fully utilize the CPU core it's running on, because even when it has no work to do it stays busy polling for new events.

A data storage node also runs one or more other applications, for example a File application that provides a File interface to the host computers. The Block and the File applications may be used simultaneously for example, each with a different load that can dynamically change over time. For good overall performance, the data storage node preferably can dynamically adapt to the user operation pattern of the two (or more) applications.

However, since the Block application employs block threads that are running on all CPU cores and would utilize 100% of those cores in the absence of other limits, such a requirement for dynamic adaptation in executing both the Block application and Other application is not straightforward. For example, a scenario can be imagined in which only the Other application is used but can use only up to 50% of the CPU, with the other 50% used just for Block polling.

Thus a two-level scheduling architecture is used to create an event-driven storage system out of the always-polling model, enabling the multitasking of the Block application with other applications such as a File application along with dynamic adaptation to user operation pattern.

Embodiments

Figure 1:
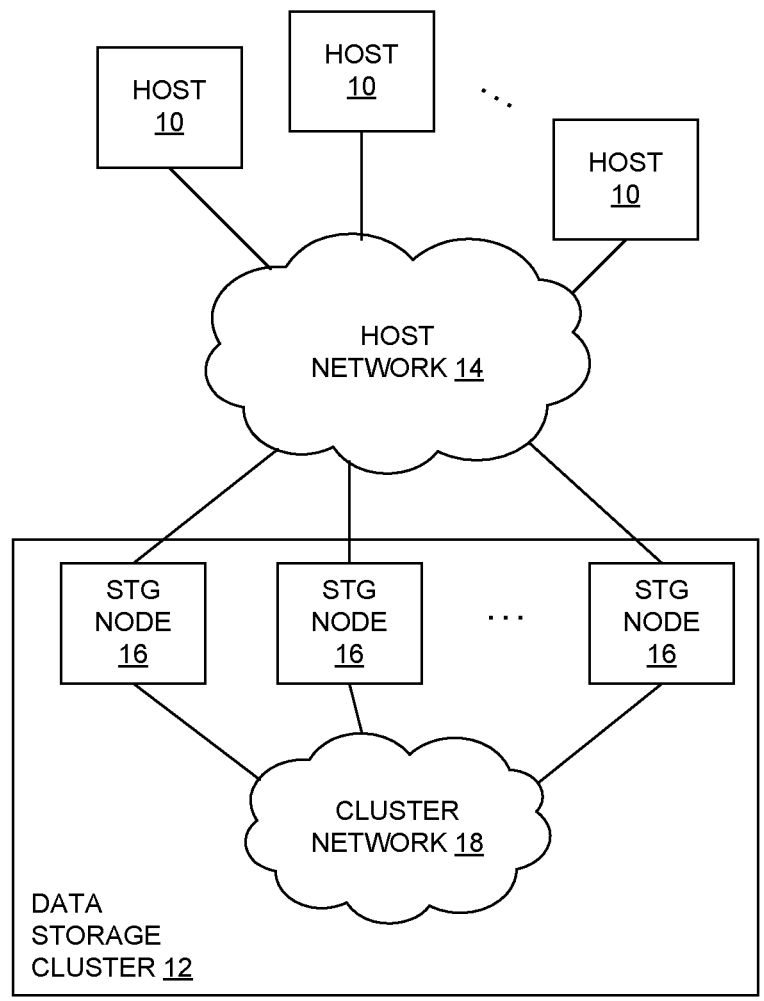
FIG. 1 is a block diagram of a computing system including a cluster of data storage nodes.

FIG. 1 shows a computing system having a plurality of host computers (Hosts) 10 coupled to a data storage cluster 12 by a first network shown as a host network 14. As shown, the data storage cluster 12, also referred to herein as simply "cluster" 12, includes a set of individual storage (STG) nodes 16 each connected to the host network 14 and coupled together by a second network shown as a cluster network 18. Each storage node 16 includes data storage media such as flash-programmable semiconductor memory ("flash"), along with specialized interface and processing circuitry providing for storage command processing and other functionality. Additional details of the cluster 12 are described below. At a high level, the cluster 12 provides secondary storage services to the hosts 10, i.e., the persistent storage of data accessed as secondary storage (in contrast to primary memory), the retrieval of stored data, and other related services (e.g., compression, de-duplication) as generally known in the art. The clustering of the storage nodes provides an ability for host I/O requests to be forwarded from one storage node 16 to another, which provides a variety of system-level possibilities and benefits as also generally known in the art.

Figure 2:
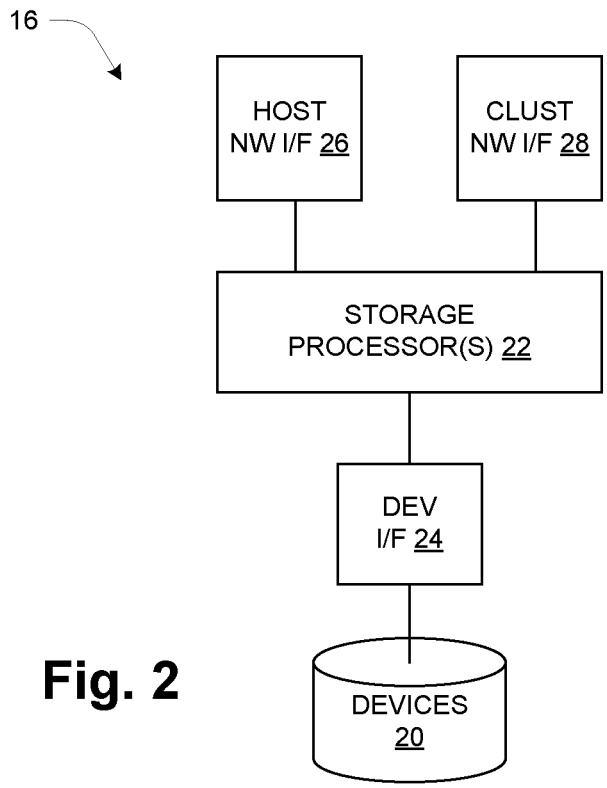
FIG. 2 is a block diagram of a storage node.

FIG. 2 shows structure of a storage node 16. As mentioned, data storage is provided by storage media which is shown as "devices" 20, reflecting a logical organization of raw semiconductor data storage into logical storage devices analogous to magnetic disks. A set of storage processors 22 provide the primary functionality of writing/reading data to/from the devices 20 in response to storage I/O requests received from the hosts 10 or other storage nodes 16 of the cluster. The storage node 16 further includes device interface circuitry (DEV I/F) 24 that interfaces the storage processors 22 to the devices 20; host network interface circuitry (HOST NW I/F) 26 that interfaces the storage processors to the host network 14 (FIG. 1); and cluster network interface circuitry (CLUST NW I/F) 28 that interfaces the storage processors 22 to the cluster network 18 (FIG. 1). In operation, storage I/O requests are received by the host network interface 26 and the cluster network interface 28 and signaled to the storage processors 22, which process the requests to carry out the corresponding operations. For read requests, the requested data is obtained and returned to the requestor, while for writes the data is written to storage and then acknowledged to the requestor. As mentioned, the storage processors 22 may maintain a volatile in-memory storage cache which is used to satisfy both the read and write requests. Read misses require obtaining an extent of data from a device 20 and storing it into the cache for satisfying the current read request as well as future read requests for other data of the extent. For writes, the cache serves as a buffer, and a background process is used to destage buffered write data to the devices 20 as necessary. Also as generally known, the storage processors 22 may provide a variety of higher-level functions in addition to basic read and write data storage operations as described above. These include compression, de-duplication, RAID and other forms of redundancy, etc.

Figure 3:
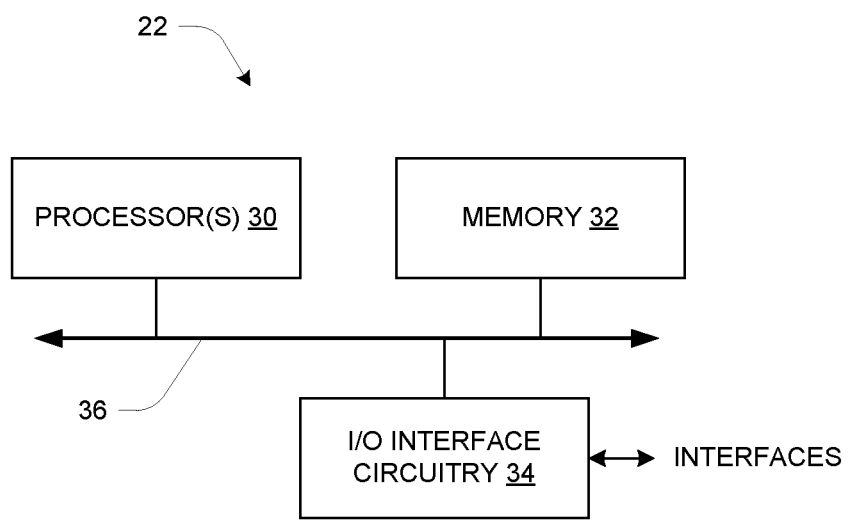
FIG. 3 is a block diagram of a storage processor from a computer hardware perspective.

FIG. 3 shows an example configuration of a storage processor 22 from a computer hardware perspective. The hardware includes one or more processors 30, memory 32, and interface circuitry 34 interconnected by data interconnections 36 such as one or more high-speed data buses. The interface circuitry 34 provides hardware connections to the interfaces 24, 26, and 28 (FIG. 2). The processor(s) 30 with connected memory 32 may also be referred to as "processing circuitry" herein. In operation, the memory 32 stores data and instructions of system software (e.g., operating system) and one or more application programs which are executed by the processor(s) 30 to cause the hardware to function in a software-defined manner. Additional information about application-related structure and functionality are described below. Application software (including an operating system) may be stored on a non-transitory computer-readable medium such as an optical or magnetic disk, Flash memory or other non-volatile semiconductor memory, etc., from which it is retrieved for execution by the processing circuitry, as generally known in the art.

Figure 4:
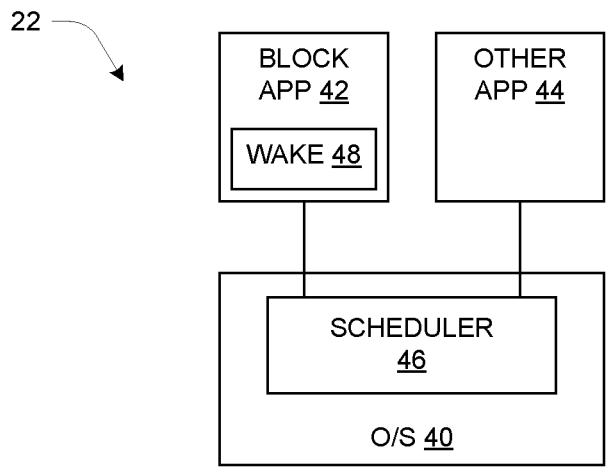
FIG. 4 is a high-level block diagram of a storage processor from a software perspective.

FIG. 4 illustrates software-related structure of a storage processor 22, including an operating system (O/S) 40, a Block application (APP) 42, and an Other application 44. The term "block" in "Block application" refers to the view of secondary storage as a linear, addressable array of fixed-sized blocks (e.g., 4 Kb), along with the use of block-oriented storage protocols such as iSCSI or FibreChannel in the networks 14, 18. This is in contrast to other views of secondary storage, notably a file-based view in which the data is organized into a system of variable-size "files", each being a linear array of bytes. In one embodiment, the Other application 44 is a File application that is based on a file view of stored data, i.e., presenting a file interface to the hosts 10 and using a file-based protocol over the host network 14.

As shown, the operating system 40 includes a scheduler 46, and the Block application 42 includes a set of wakeup threads (WAKE) 48. These components operate together to provide a two-level technique of managing multitasking in the storage node 16. Details are provided below.

Figure 5:
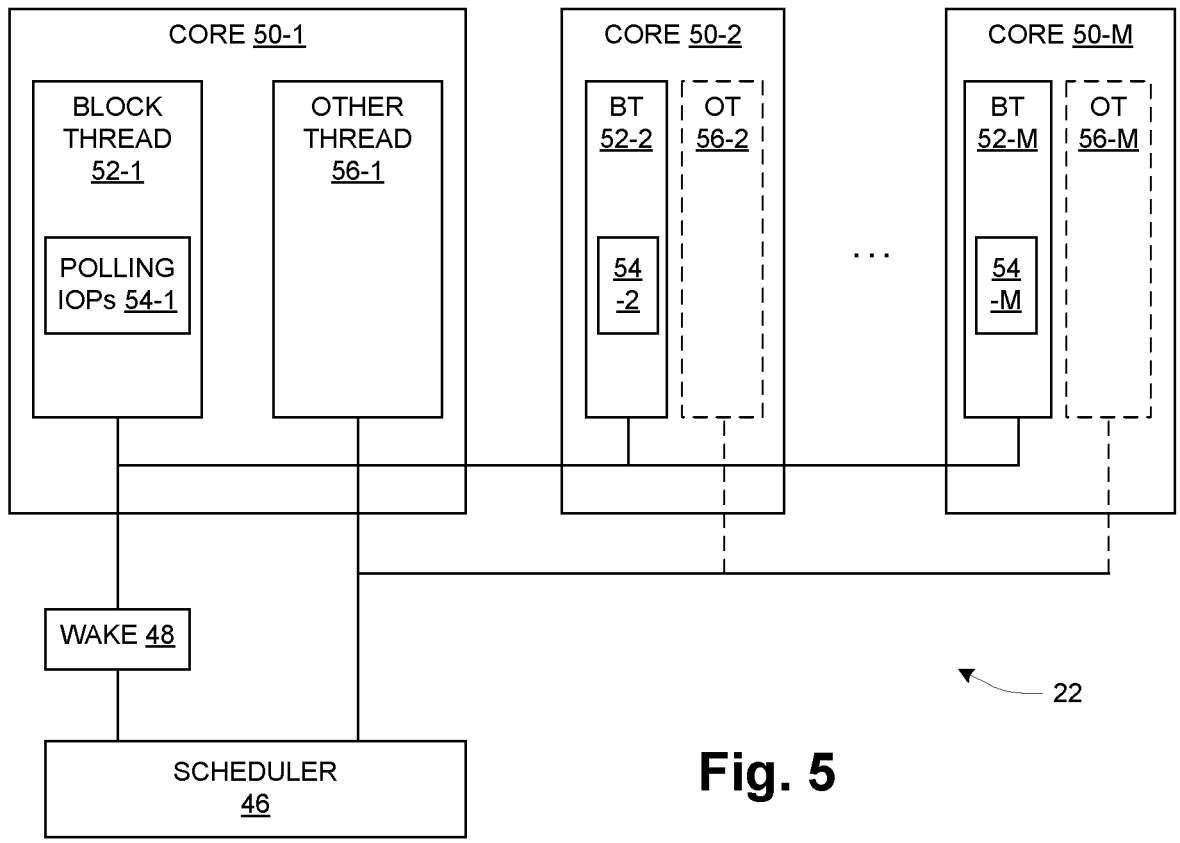
FIG. 5 is a more detailed functional block diagram of a storage processor.

FIG. 5 illustrates additional structure of a storage processor 22, namely its inclusion of a plurality of processing cores 50 (shown as 50-1, 50-2, etc.). As generally known, the cores 50 are distributed among one or more multi-core CPU integrated circuits, a detail that is omitted in FIG. 5. Each core 50 includes a respective instance of a block thread (BT) 52, which is a processing thread implementing functionality of the Block application 42. Each block thread 52 includes a respective set of polling I/O providers (IOPs) 54, which are described below. At least some of the cores 50 also execute an instance of an "other" thread (OT) 56 which is a thread of the Other application 44 (such as a File application, as described above). Dashed lines indicate the possible non-presence of the other thread 56 at some of the cores 50. In the description below, operation of an individual block thread 52 is described, and it will be understood that this applies to each of the individual core-affined instances of block threads 52-1, 52-2, etc.

As shown in FIG. 5, the wakeup threads 48 have functional connections to each of the block threads 52, and the scheduler 46 has functional connections to the wakeup threads 48 and the other threads 56; these connections support the two-level scheduling functionality as described herein. The wakeup threads 48 and scheduler 46 are shown apart from the cores 50, which reflects that they need not be core-affined nor even multi-instanced, notwithstanding that like all the operating software they too are executed by program execution circuitry of one or more cores 50. In addition to the specific two-level scheduling involving the block threads 52 as described herein, it will be understood that there is concomitant general scheduling of usage of the cores 50 by other software components, including for example the wakeup threads 48 and scheduler 46. Such general, separate scheduling may be conventional and is not elaborated herein.

Thus the Block application 42 is executed as a set of hard-affined block threads 52 per each CPU core 50, which implements the block functionality. As part of its operation, each block thread 52 always polls its interfaces for new events, for example it polls for completions of submitted IO requests to the devices 20, and polls for new IO requests from the hosts 10 or other storage nodes 16. Therefore, each block thread 52 by design would fully utilize the CPU core 50 that it is running on, because even when there's no actual work, it always keeps checking its interfaces. This design is optimized for a storage system that requires low latency and high I/O rate (I/O per second or IOPS), as there are no context switches and no interrupts involved.

Every block thread 52 includes a set of IO provider (IOPs) 54 which are responsible for polling respective interfaces. The following lists the interfaces and their corresponding IO-Providers 54:

Front-End: The interface for receiving (and replying to) IO requests from a host, via the host network interface 26 (FIG. 2). A Front-End IO-Provider (one of the IOPs 54) polls for new IO requests.

RPC Messaging: The interface for sending/receiving messages to/from other storage nodes 16, via the cluster network interface 28 (FIG. 2). An RPC Messaging IO-Provider (one of the IOPs 54) polls for new messages from other storage nodes 16 in the system.

RDMA Messaging: The interface for remote direct memory access (RDMA) transfer of buffers between storage nodes 16, via the cluster network interface 28 (FIG. 2). An RDMA Messaging IO-Provider (one of the IOPs 54) polls for the completion of RDMA transfers.

Back-End: The interface for accessing the Disk Array e.g. Read/Write IOs to the devices 20, via the device interface 24 (FIG. 2). A Back-End IO-Provider (one of the IOPs 54) polls for completion of read/write requests initiated by the block thread 52 to the devices 20.

In addition to the Block application 42, a storage node 16 is required to run another application 44, for example a File application (i.e. another process, perhaps in a different OS container) that provides a File interface to users of the system (i.e., to the hosts 10). The storage system use patterns may dynamically change over time. Thus, the system may use only the Block application 42 for some time and then use only the File application 44, or it may use both of them simultaneously, each with a different load that can also change. Therefore, the storage system is preferably able to dynamically adapt to the user operation pattern of the two applications to support dynamic load balancing.

However, since the Block application 42 uses block threads 52 that are running on all CPU cores 50 that would use 100% of the cores 50 absent any limitation, such a requirement is not straightforward to meet. For example, it can be imagined that an O/S scheduler might assign equal shares of processing resources to the Block application 42 and Other application 44. In a scenario in which only the Other application 44 is being used, it could utilize only up to 50% of the processing capacity of a storage processor 22, and the other 50% would be used just for Block polling. Such a technique would not make very efficient use of the available processing resources.

Thus a more complex and dynamic two-level scheduling architecture is used that effectively creates an event driven storage system out of the always-polling model employed by the block threads 52, enabling the multitasking of the Block application 42 with one or more Other applications 44 and dynamic adaptation to user operation pattern. The two-level technique includes use of the wakeup threads 48 that are responsible for waiting for new events from respective interfaces, detecting which block threads 52 the events refer to, and waking up (i.e., activating) those block threads 52. The wakeup thread for each interface is blocking on that interface. When an interface receives a new event, its associated wakeup thread 48 is scheduled by the OS scheduler 46. Then, the wakeup thread 48 detects the specific block thread 52 that the new event refers to and wakes up that block thread 52. Thus in this approach, the block threads 52 actively yield or suspend execution under certain conditions and wait for the wakeup threads 48 to wake them up. This feature is described more below.

The wakeup threads 48 preferably do not perform any substantive work of the Block application 42, but rather their responsibility is limited to understanding which block thread 52 should handle each new event and waking up that block thread 52. After waking up, a block thread 52 resumes its normal flow of execution, i.e. it polls its interfaces, fetches new events and process all the work that derives from them. Thus, performance is similar to a system employing such block threads that fully own the cores 50 on which they execute, i.e., a system having the block application 42 but no other application 44. In the presently disclosed system, as long as a block thread 52 is running, new events arriving for that block thread 52 are fetched and handled by the block thread 52 without any intervention of a wakeup thread 48 or the scheduler 46.

When all in-flight operations of a block thread 52 are in a waiting state (e.g. waiting for a completion from a device 20, waiting for RDMA transfer completion, etc.), the block thread 52 releases the associated core 50, which enables the scheduler 46 to assign the Other application 44 to use the core 50 until the block thread 52 is awakened again. The operation of the block threads 52 is a combination of an event driven model and a polling model, because after a block thread 52 wakes up due to an event, it resumes its normal operation of polling until it releases the core 50 and awaits a subsequent wake-up by a wakeup thread 48.

Figure 6:
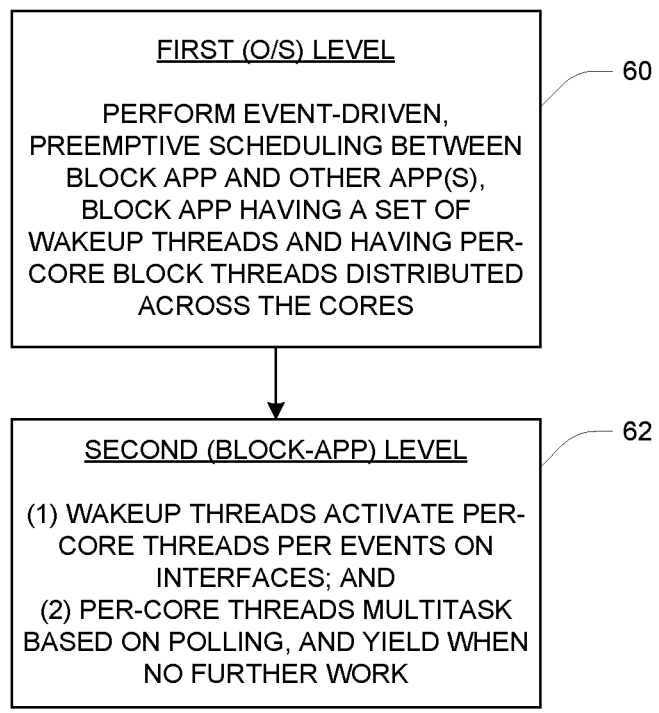
FIG. 6 is a high-level flow diagram of two-level scheduling operation of a storage processor.

FIG. 6 is a high-level flow diagram of the two-level scheduling operation, including operations at a first (operating system) level 60 and at a second (Block application) level 62. At the first level 60, the scheduler 46 performs event-driven, preemptive scheduling of per-core CPU usage between the Block application 42 and the Other application(s) 44. Scheduling at this level is based on interface events that require processing by a block thread 52, but in the first instance such events result in first scheduling the corresponding wakeup thread 48 for the interface on which an event occurs. Thus for example, if a device 20 has completed a data read operation and generates a completion event accordingly, that event in the first instance is associated with the wakeup thread 48 for the back-end interface. The scheduler 46 schedules that wakeup thread 48 to run according to its priority relative to Other application(s) 44.

At the second level 62, the wakeup threads 46 activate per-core block threads 52 based on the interface events that the wakeup threads 46 receive, and the per-core block threads 52 respond to being activated (or woken up) by conducting their regular polling and processing. For this operation, the wakeup threads 46 have access to event data that describes which block thread 52 is performing the processing with which the event is associated (e.g., which thread 52 initiated a device read operation, continuing with the above example), and this data is used to identify the specific block thread 52 to wake up based on each specific event that has occurred. Once a block thread 52 is activated, its regular polling (using its IOPs 54) identifies both the event that has triggered activation and any other events that have occurred or that occur during this execution instance, and each event is processed either to completion or to a next stage where additional waiting is required. For those tasks awaiting subsequent events, the above-mentioned event data is updated to associate an expected event with the specific block thread 52 that is performing the associated processing, to enable a wakeup thread 46 to identify the correct block thread 52 when the event later occurs. Once a block thread 52 has completed processing of identified events and its polling indicates that there are no additional events to be processed, then the block thread 52 suspends itself and yields the core 50 back to the scheduler 46 for potential use by the Other application(s) 44.

The technique requires that each of the interfaces implements a blocking mode, in addition to the polling mode, which is usually supported. An additional Timer thread (blocking) can be created which periodically wakes up the block threads 52 even if there are no new events from any of the interfaces. This can be useful to allow the block threads 52 to poll any interface that does not support a blocking mode, and also to allow the block threads 52 to perform background activity.

Preferably, a block thread 52 that is executing cannot be preempted by the scheduler 46, but rather continues to run until it voluntarily yields the respective core 50, even if the Other application 44 is ready to run. In addition, it is preferred that when a waiting block thread 52 becomes ready to run after being awakened by a wakeup thread 48, the scheduler 46 immediately preempts the Other application 44 if running and schedules the ready block thread 52. To ensure these requirements, the operating system scheduling policy for the Block application 42 is preferably configured with a priority higher than the priority of the other (File) application 44. This configuration ensures that the scheduler 46 always allows a ready block thread 52 to run until it voluntarily releases the core 50.

The disclosed technique enables the Block application 42 to utilize the CPU cores 50 in correlation to the user pattern, rather than constantly consume 100% utilization, and allows the Other application(s) 44 to utilize remaining CPU cycles. Thus for example, if the Block application 42 consumes 20% of each block thread 52, the File application 44 will be able to utilize the remaining 80% of each block thread 52.

The following pseudo-code snippet demonstrates the logic of a wakeup thread 48 for an interface:

```
While (TRUE) {
Event=Wait_For_New_Events_From_Interface( )
Thread_To_Wakeup=Get_Thread_From_Event(Event)
If (Is_Running(Thread_To_Wakeup))
    Continue
Else
    Wake_Up(Thread_To_Wakeup)
}
```

The following pseudo-code snippet demonstrates the logic of a block thread 52:

```
While (TRUE) {
Do {
/* poll all interfaces and create corresponding tasks */
tasks_list=Poll_And_Fetch_Front_End_Available_Requests( )
tasks_list+=Poll_And_Fetch_RPC_Messaging_Events( )
tasks_list+=Poll_And_Fetch_RDMA_Messaging_Events( )
tasks_list+=Poll_And_Fetch_Back_End_Completions( )
Process_tasks(tasks_list)
}While (tasks_list is not empty)
/* reaching here when no tasks at all or all in-flight tasks
are waiting. Call Yield( ) to voluntarily release the CPU until
later awakened */
Yield( )
/* reaching here after a wakeup thread detected new
events for this block thread */
}
```

Additional Improvements

An improvement for this mechanism is to have the block threads 52 check the OS scheduling if there are Other applications ready to run before the block thread 52 releases the CPU. If no Other application is waiting for the CPU, the block thread 52 can avoid releasing the CPU and keep its normal operation for an additional period, to reduce context-switch penalties. The block thread 52 would continue polling for the additional period, and process any events that might be identified, then once no more processing is possible (all in-flight operations are waiting for events that will occur later), it would release the CPU.

ALTERNATIVES

Although the description herein is directed to use of a block-storage application as a particular example of a polling-based application, it will be appreciated that the disclosed technique may be applicable to other types of polling-based applications. Additionally, in alternative embodiments the polling may be done using mechanisms other than the per-interface IOPs as described above. Additionally, the activating of the per-core threads may be done in different ways not necessarily requiring use of per-interface wakeup threads as described.

While various embodiments of the invention have been particularly shown and described, it will be understood by those skilled in the art that various changes in form and details may be made therein without departing from the scope of the invention as defined by the appended claims.

What is claimed is:

1. A data storage node to be used in a data storage system, comprising:
    hardware data storage devices for persistent secondary storage of data;
    a set of hardware interfaces including at least a front-end interface to a host computer network and a device interface to the data storage devices; and
    a hardware storage processor including a plurality of processing cores, the storage processor executing computer program instructions of a first application and a second application as well as a scheduler, the first application and second application being subject to a user operation pattern, the execution of the computer program instructions causing two-level multitasked operation of the data storage node including:
        at a first level, by the scheduler, performing event-driven, preemptive scheduling between the first application and the second application, the first application including a plurality of first threads distributed among corresponding processing cores of the data storage node, each first thread having a regular operation of polling respective interfaces of the data storage node for events for the first application; and
        at a second level, by the first application: (1) upon occurrence of activating events, activating corresponding first threads of the first application on respective processing cores, and (2) by each of the first threads upon being activated, (i) continually polling the interfaces of the data storage node for additional events requiring processing, and (ii) performing processing tasks for the additional events until there are no unprocessed additional events, and thereupon entering a sleep state and returning control over use of the respective processing core to the first-level scheduling to thereby adapt use of the processing cores according to the user operation pattern.

2. The data storage node of claim 1, wherein:
    the first application is a block-storage application and the first threads are block threads each including a respective set of IO providers for performing the polling of the respective interfaces; and
    the block-storage application includes wakeup threads being scheduled at the second level upon occurrence of the events, and operative to activate corresponding ones of the block threads of the block-storage application on respective processing cores.

3. The data storage node of claim 2, wherein the interfaces of the data storage node include (1) a device interface to a data storage medium of the data storage node structured as logical storage devices, (2) a host network interface to a host network and host computers connected thereto, and (3) a cluster network interface to a cluster network interconnecting the data storage node with other data storage nodes of the data storage system, and wherein the set of IO providers includes (a) a front-end IO provider operative to poll the host network interface for new IO requests, (b) an RPC messaging IO provider operative to poll the cluster network interface for new messages from other data storage nodes 16 in the system, (c) an RDMA messaging IO provider operative to poll the cluster network interface for completion of remote DMA (RDMA) transfers, and (d) a back-end IO provider operative to poll the device interface for completion of IO requests initiated by the block thread to storage devices of the data storage node.

4. The data storage node of claim 1, wherein the event-driven preemptive scheduling observes scheduling rules including (1) that a first thread that is executing does not get preempted even when a thread of the second application is ready to run, and (2) that a thread of the second application that is executing is preempted by a waiting first thread that has become ready to run after being awakened.

5. The data storage node of claim 4, wherein a scheduling policy for the first application is configured with a priority higher than a priority of the second application, ensuring that the scheduling allows a ready first thread to run until it voluntarily releases the respective processing core.

6. The data storage node of claim 1, wherein the second-level processing further includes, by the first thread prior to entering the sleep state to return control to the first-level scheduling, (1) checking whether there are threads of the second application ready to run, and (2) if the threads of the second application are not ready to run, then continuing the polling and processing operations an additional period to avoid a context-switch penalty.

7. The data storage node of claim 1, wherein the first application further includes a timer thread operative to periodically wake up the first threads even if there are no new events from any of the interfaces, enabling the first threads to poll any interface that does not support a blocking mode, or to perform background activity.

* * * * *